United States Patent
Wigren

(10) Patent No.: US 8,605,842 B2
(45) Date of Patent: Dec. 10, 2013

(54) LOAD ESTIMATION IN INTERFERENCE WHITENING SYSTEMS

(75) Inventor: Karl Torbjörn Wigren, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 161 days.

(21) Appl. No.: 13/376,908

(22) PCT Filed: Jun. 11, 2009

(86) PCT No.: PCT/SE2009/050710
§ 371 (c)(1),
(2), (4) Date: Dec. 8, 2011

(87) PCT Pub. No.: WO2010/144004
PCT Pub. Date: Dec. 16, 2010

(65) Prior Publication Data
US 2012/0082195 A1 Apr. 5, 2012

(51) Int. Cl.
*H03D 1/04* (2006.01)

(52) U.S. Cl.
USPC ........... 375/346; 375/148; 375/349; 455/501; 455/63.1; 455/67.11; 455/296

(58) Field of Classification Search
USPC ........ 375/144, 147, 148, 260, 340, 346, 347, 375/349; 455/501, 13.4, 63.1, 67.11, 67.13, 455/226.1–226.4, 296; 370/318, 342, 344, 370/464, 465, 478, 479, 480
See application file for complete search history.

(56) References Cited

U.S. PATENT DOCUMENTS 8,306,091 B2 * 11/2012 Wigren ............... 375/141
2013/0095870 A1 * 4/2013 Phillips et al. ............... 455/501

FOREIGN PATENT DOCUMENTS

WO 2007/117188 A1 10/2007

OTHER PUBLICATIONS

Cozzo, C. et al. "Capacity Improvement with Interference Cancellation in the WCDMA Enhanced Uplink." The 17th Annual IEEE International Symposium on Personal, Indoor and Mobile Radio Communications (PIMRC '06), Helsinki, Finland, Sep. 11-14, 2006.
Zhang, D. et al. "HSUPA Scheduling Algorithms Utilizing RoT Measurements and Interference Cancellations." IEEE International Conference on Communication, 2008 (ICC '08), Beijing, China, May 19-23, 2008.

* cited by examiner

*Primary Examiner* — Dac Ha
(74) *Attorney, Agent, or Firm* — Coats & Bennett, P.L.L.C.

(57) ABSTRACT

A method for noise rise estimation in a wireless communication system comprises measuring (210) of received total wideband power a plurality of times and computing (212) of an estimate of a noise floor measure based on at least a number of the measured received total wideband powers. The method further comprises performing (214) of an interference whitening based on one of GRAKE, GRAKE+ and chip equalizer for a first user and determining (216) of a user equivalent total wideband power as an available total wideband power after the interference whitening for the first user. The estimate of a noise floor measure is compensated (218) for the interference whitening into a user equivalent noise floor measure and a noise rise measure for the first user is calculated (220) based at least on the user equivalent total wideband power and the user equivalent noise floor measure.

16 Claims, 9 Drawing Sheets

LOAD ESTIMATION IN INTERFERENCE WHITENING SYSTEMS

TECHNICAL FIELD

The present invention relates in general to methods and devices for estimation of power-related quantities in cellular communications systems and in particular to such methods and devices in cellular communications systems using interference whitening.

BACKGROUND

Wideband Code Division Multiple Access (WCDMA) telecommunication systems have many attractive properties that can be used for future development of telecommunication services. In order to retain stability of a cell, the load needs to be kept below a certain level. This follows since the majority of uplink user channels, at least in WCDMA, are subject to power control. This power control aims at keeping the received power level of each channel at a certain signal to interference ratio (SIR), in order to be able to meet specific service requirements.

Since the Radio Base Station (RBS) tries to keep each channel at its specific preferred SIR value, it may happen that an additional user, or bursty data traffic of an existing user, raises the interference level, thereby momentarily reducing the SIR for the other users. The response of the RBS is to command a power increase to all other users, something that increases the interference even more. Normally this process remains stable below a certain load level. In case a high capacity channel would suddenly appear, the raise in the interference becomes large and the risk for instability, a so called power rush, increases. It is thus a necessity to schedule high capacity uplink channels, like the enhanced uplink (EUL) channel in WCDMA, so that one can insure that instability is avoided. In order to do so, the momentary load must be estimated in the RBS or any node connected thereto. This enables the assessment of the capacity margin that is left to the instability point.

One approach to improve load estimation is disclosed in the published international patent application WO 2006/076969. A minimum value of a power quantity, preferably a difference between the instantaneous total received wideband power and the instantaneous sum of powers of all links used in the same cell, is used as an estimate of an upper limit of the thermal noise floor, based on which a noise rise measure can be estimated. An optimal and soft algorithm for noise rise estimation based on a similar basic idea of minimum values is disclosed in the published international patent application WO 2007/024166.

To handle increasing uplink data rates, interference cancellation (IC) is being introduced in WCDMA. A conventional procedure to perform IC is summarized by the following steps. A channel model of the interferer to be cancelled is estimated. This does not cause any additional operations, since this channel model is anyway needed. The transmitted signal of the interferer to be cancelled is also decoded. This is also anyway needed. A replica of the received signal of the interferer to be cancelled is then created, by use of the channel model and the decoded signal. This replica may e.g. be reconstructed as an IQ chip stream. The replica of the interfering signal is subsequently subtracted from the received signal of the user to be decoded, thereby hopefully reducing the remaining power of the interferer to very low power levels.

This procedure obviously affects the load measurement functionality of the WCDMA EUL. Thus, the scheduler must be aware of the instantaneous uplink load in several signal points of the new IC receiver structure in order to be able to utilize the entire amount of resources. Unless such load estimates are made available it will not be possible to exploit the link gains fully, when scheduling EUL users. In the published international patent application WO 2008/097145, load estimation with IC of this conventional type is handled in analogy with earlier noise rise estimation procedures.

Another approach to limit the effect of interference is to use some kind of interference whitening approaches, such as GRAKE, GRAKE+ or chip equalizer. In GRAKE+, a covariance matrix $\hat{R}_u$, u=1, ..., U, with an order equal to the number of fingers is first estimated to capture the interference. The codes not used by the present user u may be used in order to estimate the covariance matrix $\hat{R}_u$. The GRAKE+ receiver thus uses an estimated covariance matrix $\hat{R}_u$ that models the interference for computation of the combining weights for the users u, u=1, ..., U. Expressed mathematically, it can be written:

$$\hat{R}_u \hat{w}_u = \hat{h}_u, \quad u=1, \ldots, U \qquad (1)$$

where $\hat{h}_u$, u=1, ..., U, is the net channel response of user u and where $\hat{w}_u$ are the combining weights. The effect of (1) is that GRAKE+ essentially whitens the correlated interference and removes large spectral peaks from interferers at certain finger locations and for certain antenna elements. Thus, in GRAKE+, the user experiences a reduced level of interference, immediately after the weight combining step. Note that GRAKE+ is still a linear receiver.

In order to utilize the reduced interference provided by the GRAKE+ receiver, the load estimations have to be performed taking the interference whitening of the GRAKE+ into account. However, in contrary to what is valid for interference cancellation based on regeneration and subtraction, the thermal noise floor is changed in the same manner as the interference reduction obtained by the GRAKE+ process, and can no longer be treated as constant after interference whitening. A treatment analogue of WO 2008/097145 can therefore not be used for achieving a noise rise estimation, the reason being that WO 2008/097145 requires the noise floor to be constant. There is thus a problem of using the created reduced interference, since no reliable noise rise estimation is available. Similar problems are present for systems utilizing GRAKE, where sub-bocks of the covariance matrix of (1) are used.

There is a related type of interference whitening receiver for WCDMA which is also linear, denoted the chip equalizer. The difference between GRAKE+ and the chip equalizer is simply the order of certain basic operations. The consequence is that the problems of providing a reliable noise rise measure are valid for the systems using the chip equalizer as well.

In the article "Capacity improvement with interference cancellation in the WCDMA enhanced uplink, by C. Cozzo and Y.-P. E. Wang, from the 17th Annual IEEE International Symposium on Personal, Indoor and Mobile Radio Communications (PIMRC'06), an IC receiver is disclosed, which cancels the high-data-rate signals prior to low-rate traffic reception.

SUMMARY

An object of the present invention is thus to provide methods and arrangements for providing reliable noise rise estimations in wireless communication systems using interference whitening methods, such as the GRAKE+ or the chip equalizer receivers.

The object is achieved by methods and arrangements according to the enclosed independent patent claims. Preferred embodiments are defined by the dependent claims. In general, in a first aspect, a method for noise rise estimation in a wireless communication system comprises measuring of received total wideband power a plurality of times and computing an estimate of a noise floor measure based on at least a number of the measured received total wideband powers. The method further comprises performing of an interference whitening based on one of GRAKE, GRAKE+ and chip equalizer for a first user and determining of a user equivalent total wideband power as an available total wideband power after the interference whitening for the first user. The estimate of a noise floor measure is compensated for the interference whitening into a user equivalent noise floor measure and a noise rise measure for the first user is calculated based at least on the user equivalent total wideband power and the user equivalent noise floor measure.

In a second aspect, an arrangement for noise rise estimation in a wireless communication system comprises a digital receiver, an interference whitener connected to the digital receiver and a processor connected to the digital receiver and to an output from the interference whitener. The interference whitener is based on one of GRAKE, GRAKE+ and chip equalizer. The interference whitener is arranged for providing interference whitening for a plurality of users at said output. The processor is arranged for measuring received total wideband power received at the digital receiver a plurality of times. The processor is further arranged for computing an estimate of a noise floor measure based on at least a number of the measured received total wideband powers. The processor is further arranged for determining a user equivalent total wideband power as an available total wideband power on the output from the interference whitener, operating for a first user of the plurality of users. The processor is further arranged for compensating the estimate of a noise floor measure for the interference whitening into a user equivalent noise floor measure and arranged for calculating a noise rise measure for the first user, based at least on the user equivalent total wideband power and the user equivalent noise floor measure.

In a third aspect, a base station of a wireless communication system comprises an arrangement for noise rise estimation according to the second aspect.

One advantage with the present invention is that the reduced interference levels achieved by GRAKE+ or chip equalizer can be fully utilized to increase the total available capacity of a wireless communication system.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
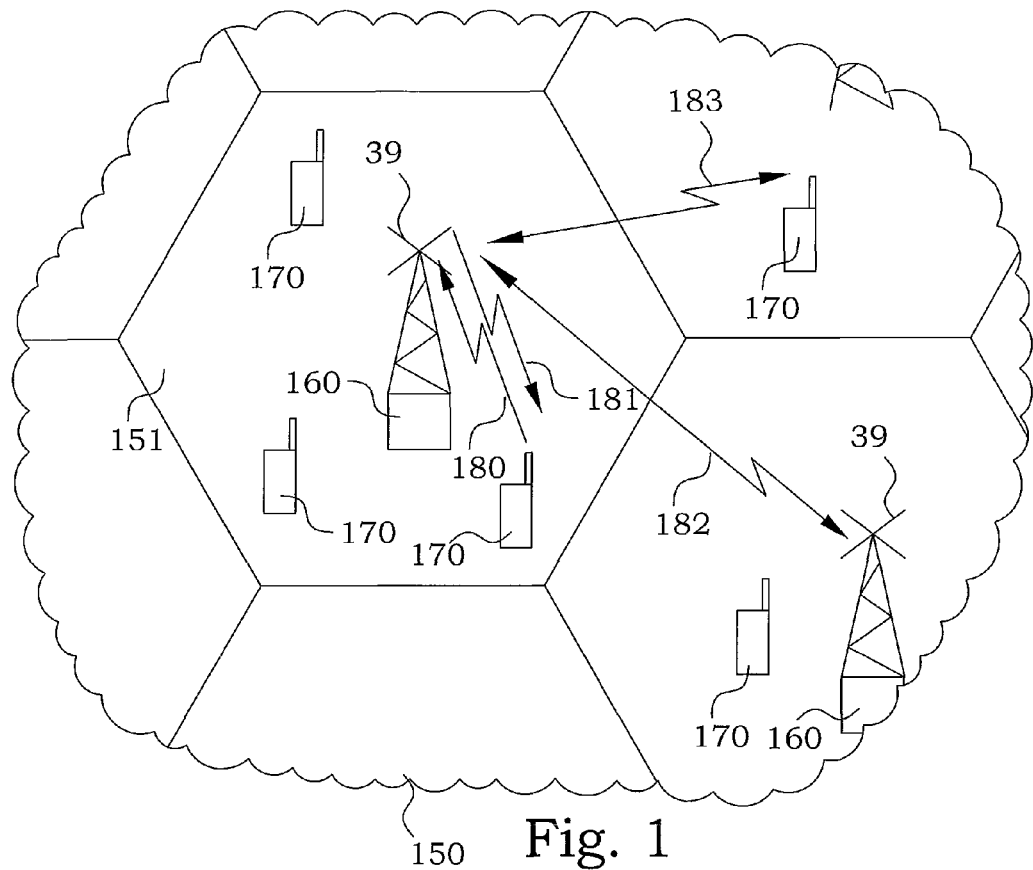
FIG. 1 is a schematic illustration of a wireless communication system.

Throughout the entire disclosure, bold letters in equations refer to vector or matrix quantities.

In the drawings, corresponding reference numbers are used for similar or corresponding parts.

The present invention relates to arrangements and methods in wireless communication systems. FIG. 1 illustrates a schematic view of an embodiment of such a wireless communication system 150. A radio base station 160 communicates via its antenna/antennas 39 with a multitude of user equipments (UE) 170 situated within a cell 151 of the wireless communication system 150. Radio signals transmitted from the RBS 160 to the UEs 170 are denoted as downlink signals 181, and radio signals transmitted from the UEs 170 to the RBS 160 are denoted as uplink signals 180. This invention mainly considers the uplink signals, whereby arrangements for noise rise estimation typically are provided in the RBS 160. Besides the intentional uplink signals 180, the RBS 160 also receives interfering signals 182, 183.

In order to understand the solved problems and advantages with the present invention, a short summary of prior art load estimation principles are presented as a background. Without IC, the load at an antenna connector is given by the noise rise, or rise over thermal (RoT), RoT(t), defined by:

$$RoT(t) = \frac{RTWP(t)}{N(t)}, \tag{2}$$

where N(t) is the thermal noise level as measured at the antenna connector. It remains to define what is meant with RTWP(t). The definition used here is simply the total wideband power:

$$RTWP(t) = \sum_{k=1}^{K} P_k(t) + I^N(t) + N(t), \tag{3}$$

also measured at the antenna connector. Here $I^N(t)$ denotes the power as received from neighbour cells ($^N$) of the WCDMA system. As will be seen below, the major difficulty of any RoT estimation algorithm is to separate the thermal noise power from the interference from neighbour cells.

Another specific problem that needs to be addressed when determining the load is that the signal reference points are, by definition, at the antenna connector. The measurements are however obtained after the analogue signal conditioning chain, in the digital receiver. The analogue signal conditioning chain does introduce a scale factor error of about 1 dB (1-sigma) that is difficult to compensate for. Fortunately, all powers of (3) are equally affected by the scale factor error so when (2) is calculated, the scale factor error is cancelled as $$RoT^{Digital\ Receiver}(t) = \frac{RTWP^{Digital\ Receiver}(t)}{N^{Digital\ Receiver}(t)} \tag{4}$$
$$= \frac{\gamma(t)RTWP^{Antenna}(t)}{\gamma(t)N^{Antenna}(t)}$$
$$= RoT^{Antenna}(t).$$

In order to understand the fundamental problem of neighbour cell interference when performing load estimation, note that $$I^N(t)+N(t)=E[I^N(t)]+E[N(t)]+\Delta I^N(t)+\Delta N(t), \quad (5)$$

where E[ ] denotes mathematical expectation and where $\Delta$ denotes the variation around the mean. The fundamental problem can now be clearly seen. Since there are no measurements available in the RBS that are related to the neighbour cell interference, a linear filtering operation can at best estimate the sum $E[I^N(t)]+E[N(t)]$. This estimate cannot be used to deduce the value of E[N(t)]. The situation is the same as when the sum of two numbers is available. Then there is no way to figure out the values of the individual numbers. This issue is analysed rigorously for the RoT estimation problem in published international patent application WO 2007/024166 where it is proved that the noise power floor is not mathematically observable.

Figure 2:
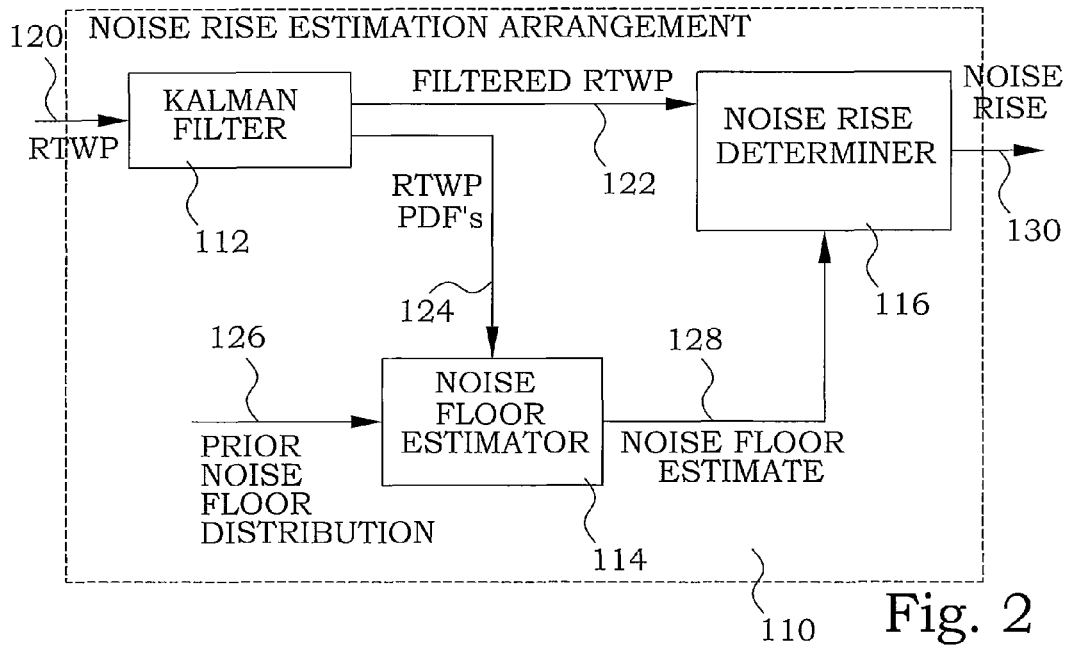
FIG. 2 is a schematic illustration of a noise rise estimation arrangement.

An embodiment of the RoT estimation algorithm currently in use is depicted in FIG. 2. It is described in detail in the published international patent application WO 2007/024166. The algorithm estimates the RoT, as given by (2). The main problem solved by the estimation algorithm is the accurate estimation of the thermal noise floor N(t). Since it is not possible to obtain exact estimates of this quantity due to the neighbour cell interference, the estimator therefore applies an approximation, by consideration of the soft minimum as computed over a relative long window in time.

In particular, an arrangement 110 for noise rise estimation in a wireless communication system is supplied with RTWP measurements 120. The RTWP measurements 120 are used in a Kalman filter 112 to produce filtered estimates 122 of the RTWP as well as probability density functions 124 of the RTWP. These probability density functions 124 are provided to a noise floor estimator 114, in which noise floor estimates 128 are provided with knowledge of a prior noise floor distribution 126. The noise floor estimator 114 operates preferably with a sliding window algorithm. The noise floor estimates 128 and the filtered estimates 122 of the RTWP are provided to a noise rise determiner 116, producing an output of a noise rise measure, in this embodiment a RoT value 130.

It is important to understand that this estimation relies on the fact that the noise floor is constant over very long periods of time (disregarding the small temperature drift).

The sliding window algorithm of the above section has the disadvantage of requiring a large amount of storage memory. This becomes particularly troublesome in case a large number of instances of the algorithm are needed, as may be the case when IC is introduced in the uplink. To reduce the memory consumption a recursive algorithm was disclosed in the published international patent application WO 2007/0055626. That algorithm reduces the memory requirements of the sliding window scheme discussed above at least by a factor of 100. The invention disclosed here is applicable both to the sliding window RoT estimation algorithm and the recursive algorithm.

Figure 3:
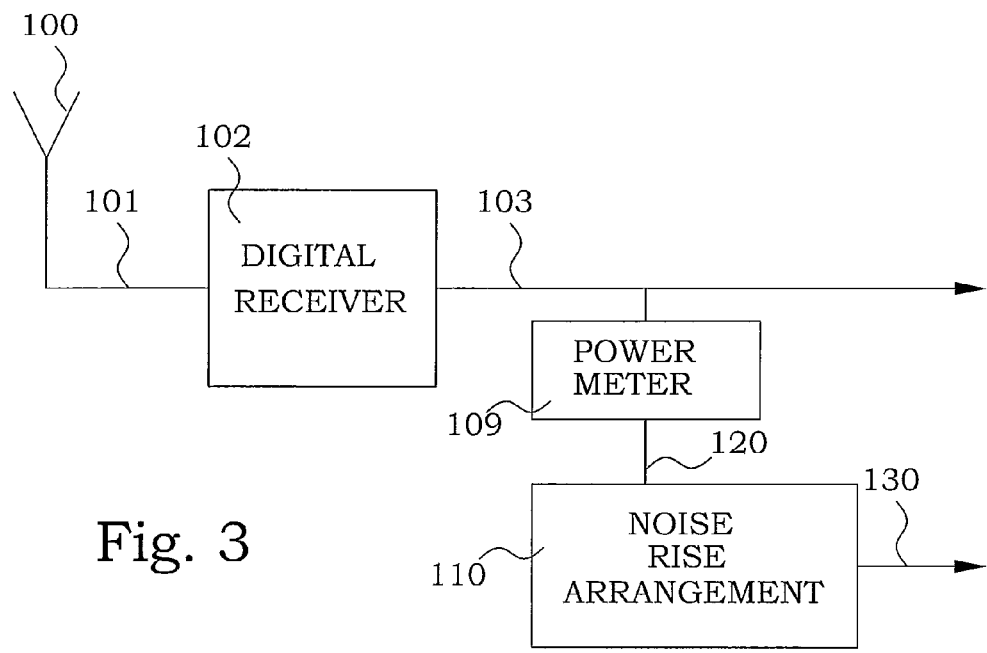
FIG. 3 is a schematic illustration of a receiver chain including a noise rise arrangement.

FIG. 3 schematically illustrates the arrangement 110 for noise rise estimation in relation to the receiver chain. An antenna 100 receives electromagnetic signals and gives rise to a received analogue signal 101, which is provided to a digital receiver 102. The digital receiver 102 provides a stream of digital signals 103 representative to the analogue signals, however, as mentioned above modified with a certain scale factor. A measurement unit 109 is connected to the stream of digital signals 103 and performs measurements of received total wideband powers 120, which are handed on to the arrangement 110 for noise rise estimation.

Figure 4:
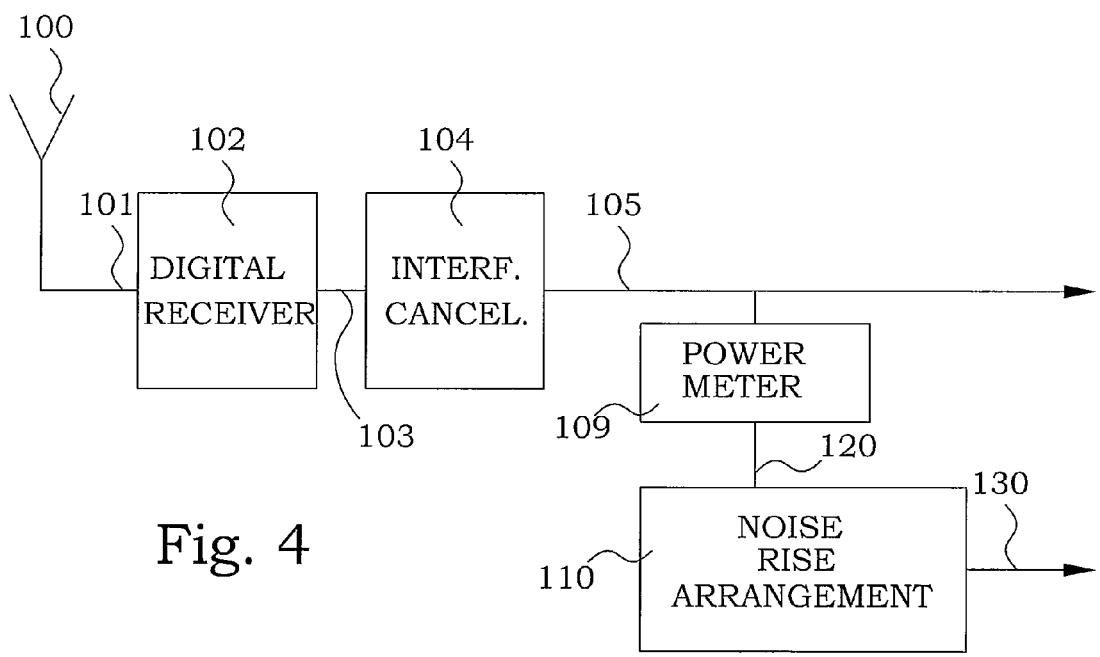
FIG. 4 is a schematic illustration of a receiver chain including interference cancellation and a noise rise arrangement.

As mentioned in the background section, different interference cancellation methods based on regeneration and subtraction are often used. This is schematically illustrated in FIG. 4. The stream of digital signals 103 is provided to an interference canceller 104, where signals not intended for a particular user are removed. An interference cancelled digital signal 105 intended for a particular user is provided as output. As also mentioned before, load estimation can be applied also to such interference cancelled digital signal 105, where the measured RTWP measure refers to the digital signal after interference cancelling. For IC with regeneration and subtraction there is no change of the scale factor for the thermal noise power floor. The consequence is that the RoT estimation algorithms are still applicable in this case, since a constant noise power level is estimated.

It is important to observe that the effect of this procedure is different for different users, since an interferer is a user on its own. The consequence for load estimation is that there is no longer a uniform way to look on the interference of the WCDMA uplink. The load instead becomes individual for each user. Hence combining user interference to a general uplink cell load is no longer trivial.

The present invention provides solutions where load estimations reflect the reduced interference experienced by users exploiting interference whitening receivers. The load of a particular single user exploiting GRAKE, GRAKE+ or the chip equalizer can be estimated. Also, the individual load estimations can be combined into a load estimation for the whole cell.

The present invention disclosure is focused on GRAKE+. However, also systems using GRAKE or chip equalizers can be configured in a similar manner. The main scope is to develop and disclose procedures for channel power estimation per user, capturing the effect of interference whitening. Furthermore, procedures for interference estimation per user, capturing the effect of interference whitening should also be provided. Noise floor scale factor estimation per user considering the effect of interference whitening is also preferably provided. Also RoT estimation or other noise rise measures per user, capturing the effect of interference whitening is calculated. This calculation uses the channel power estimate per user, the interference estimate per user and the scale factor per user. Preferably, load estimation (uplink) per cell, capturing the effect of interference whitening is also performed, using the channel power estimates per user, the interference estimates per user, the scale factors per user and the RoT estimates per user.

Figure 5A:
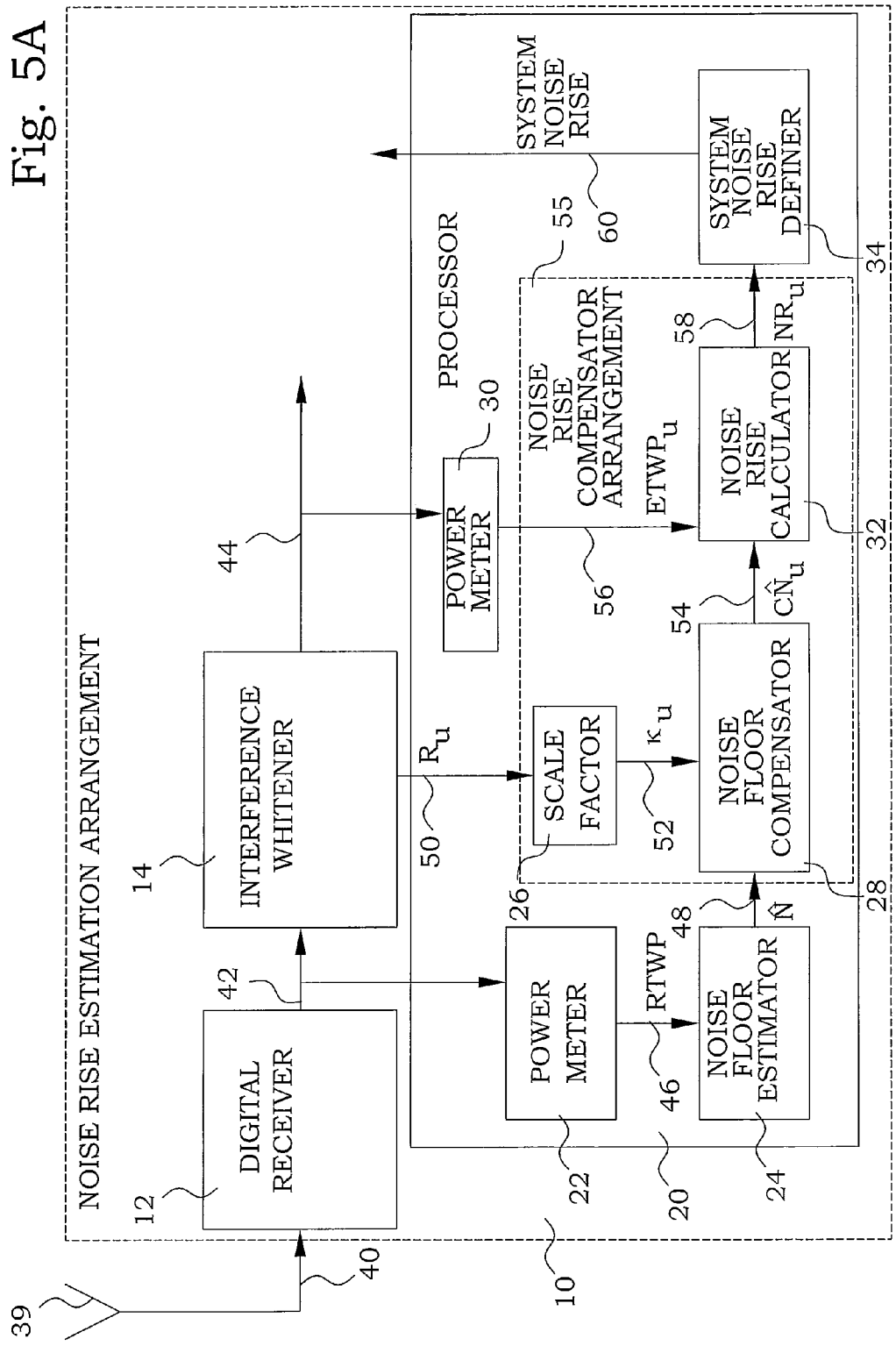
FIGS. 5A-C are schematic illustrations of a embodiments of noise rise estimation arrangements according to the present invention.

An embodiment of an arrangement 10 for noise rise estimation in a wireless communication system is schematically illustrated in FIG. 5A. The arrangement 10 for noise rise estimation comprises a digital receiver 12, an interference whitener 14 and a processor 20. The interference whitener 14 is connected to the digital receiver 12 for receiving digital signals therefrom. The interference whitener is generally based on one of GRAKE, GRAKE+ and the chip equalizer, and in this particular embodiment on GRAKE+. The interference whitener is intended for providing interference whitening for a plurality of users at an output, providing interference whitened digital signals 44.

The processor 20 is connected to the digital receiver and to the output from the interference whitener 14. The processor has a power meter 22, arranged for measuring received total wideband power 46 of the signals 42 received at the digital receiver 12 a plurality of times. These measured received total wideband powers 46 are provided at an output from the power meter 22. The processor 20 has further a noise floor estimator 24 connected to the output of the power meter 22. The noise floor estimator 24 is arranged for computing an estimate of a noise floor measure 48 based on at least a number of the measured received total wideband powers 46.

The processor 20 is further arranged for compensating the estimate of a noise floor measure for the interference whitening into a user equivalent noise floor measure. In this embodiment, the processor 20 comprises a scale factor determiner 26, connected to the interference whitener 14. The scale factor determiner 26 is provided with at least a part of a covariance matrix $R_u$ 50 representing the interference whitening. Based on at least parts of this covariance matrix $R_u$ 50, the scale factor determiner 26 determines a scale factor $\kappa_u$ 52 representing a relation between a noise floor measure before interference whitening and a noise floor measure after interference whitening. A noise floor compensator 28 is connected to the output of the scale factor determiner 26 and the output of the noise floor estimator 24, and is arranged for compensating the estimate of a noise floor measure 48 by the scale factor 52 into a corrected noise floor measure 54 for the user in question.

The processor 20 also comprises a power meter 30 connected to the output of the interference whitener 14. The power meter 30 is arranged for determining a user equivalent total wideband power 56 as an available total wideband power on the output from the interference whitener 14, operating for a first user, u, of the plurality of users. The processor 20 further comprises a noise rise calculator 32, connected to the power meter 30 and the noise floor compensator 28. The noise rise calculator 32 is arranged for calculating a noise rise measure 58 for the first user. This calculation is based at least on the user equivalent total wideband power 56 and the corrected noise floor measure 54.

In this embodiment, the arrangement 10 for noise rise estimation is further arranged for defining a system noise rise measure. The processor 20 is thereby arranged for repeating the operations for achieving a user specific noise rise measure for a plurality of users. The processor 20 further comprises a system noise rise definer 34, connected to the noise rise calculator 32. The system noise rise definer 34 is arranged for defining a system noise rise measure 60 based on the noise rise measures 58 for the plurality of users. Details of preferred procedures to achieve the system noise rise measure 60 are presented further below.

In this embodiment, the different functionalities of the processor 20 are illustrated as separate part units. However, anyone skilled in the art realises that the functionalities can be configured and realised in different manners, separately or integrated, fully or partly. The part units associated with the different functionalities should therefore only be considered as separate units concerning their functionality.

The scale factor determiner 26, the noise floor compensator 28 and the noise rise calculator 32 forms together a noise rise compensator arrangement 55, which based on the noise rise 48, the covariance matrix $R_u$ 50 and the user equivalent total wideband power 56 calculates a compensated noise rise measure. The scale factor can be used in different manners in the actual calculation. The effects caused by the interference whitening can be compensated by compensating of at least one of the user equivalent total wideband power, the noise floor measure and a ratio between the user equivalent total wideband power and the noise floor measure. Typically, only one of the quantities has to be compensated, however, in theory it would be able to e.g. compensate one factor for half the interference whitening effect and another factor for the other half. However, such solutions are only mathematical equivalences. Such equivalences are easily understood by referring to the mathematical description further below.

Figure 5B:
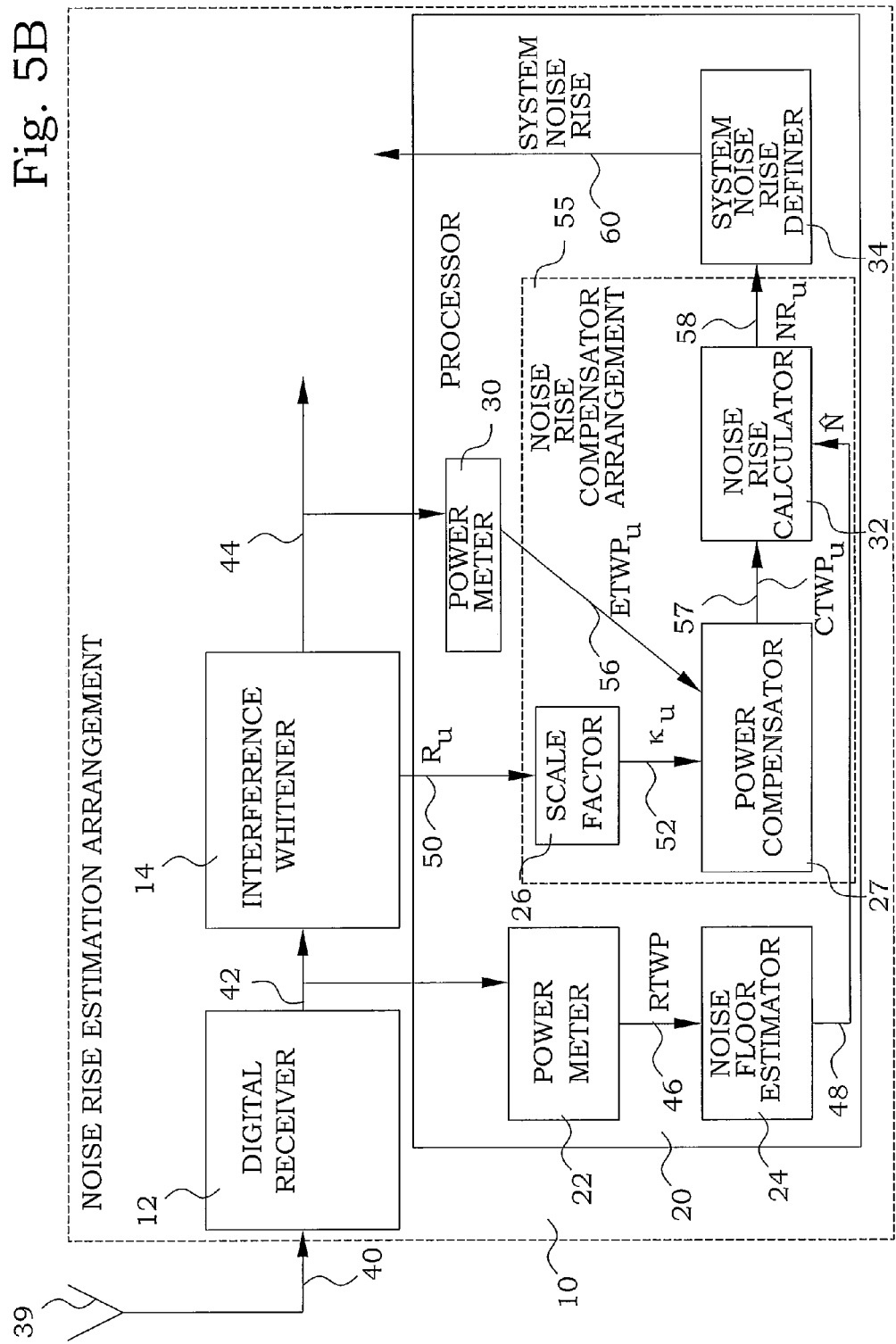

FIG. 5B illustrates an embodiment where the compensation instead is performed on the measured equivalent total wideband power. The equivalent total wideband power 56 and the scale factor $\kappa_u$ 52 are provided to a power compensator 27. The power compensator 27 provides a compensated total power measure $CTWP_u$ 57, which is a scaling of the equivalent total wideband power 56 by the scale factor $\kappa_u$ 52. The compensated total power measure $CTWP_u$ 57 and the uncompensated noise floor measure 48 are provided as inputs to the noise rise calculator 32 for provision of the correct noise rise measure 58.

Figure 5C:
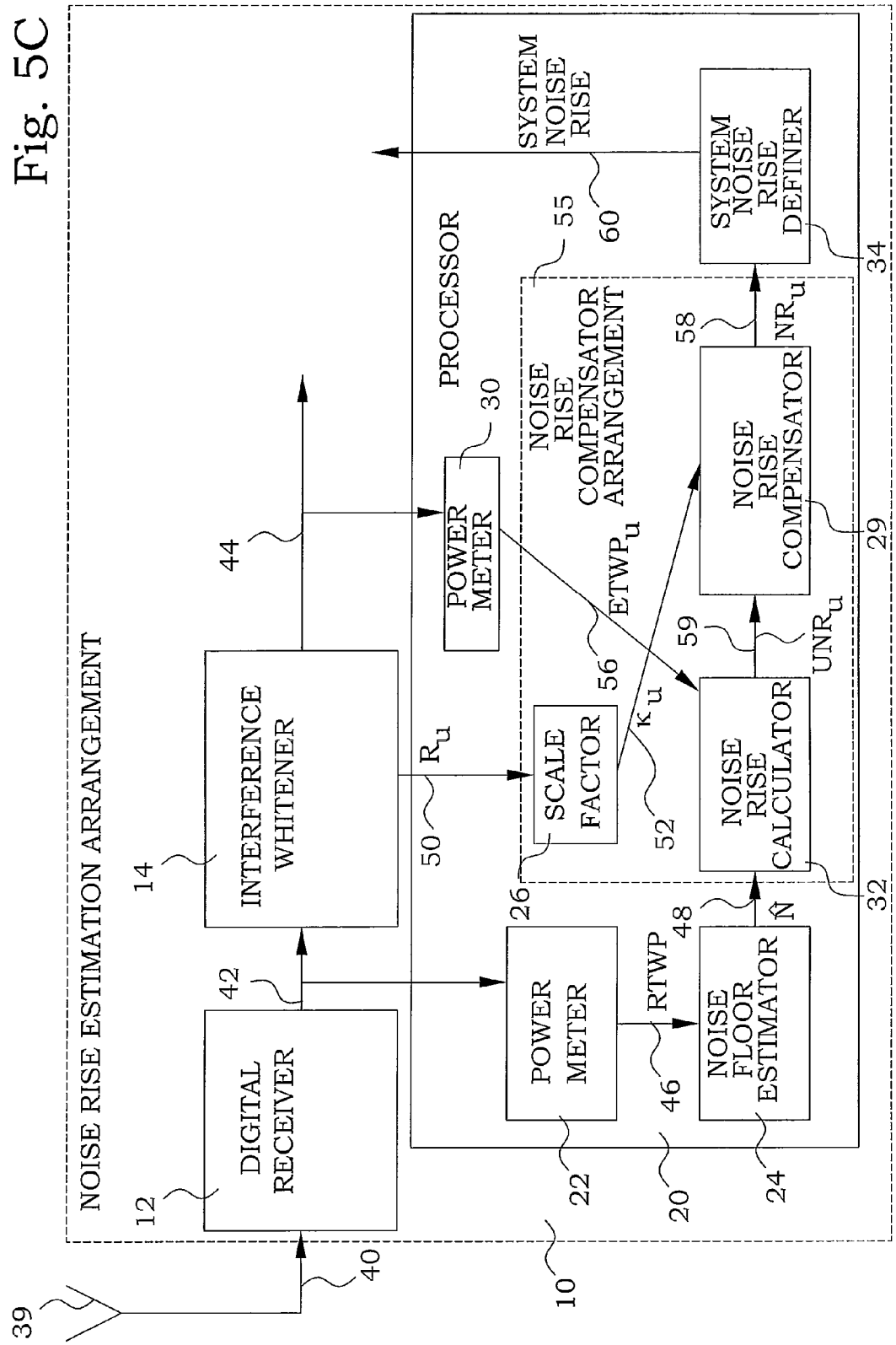

FIG. 5C illustrates another embodiment where the compensation instead is performed on the noise rise measure instead, i.e. the ratio between the user equivalent total wideband power and the noise floor measure. The equivalent total wideband power 56 and the uncompensated noise floor measure 48 are provided as inputs to the noise rise calculator 58. The output from the noise rise calculator 58 then becomes an uncorrected noise rise measure 59. This uncorrected noise rise measure 59 is provided together with the scale factor $\kappa_u$ 52 to a noise rise compensator 29, where the compensation for the interference whitening effects is performed, and a corrected noise rise measure 58 is outputted.

Figure 6A:
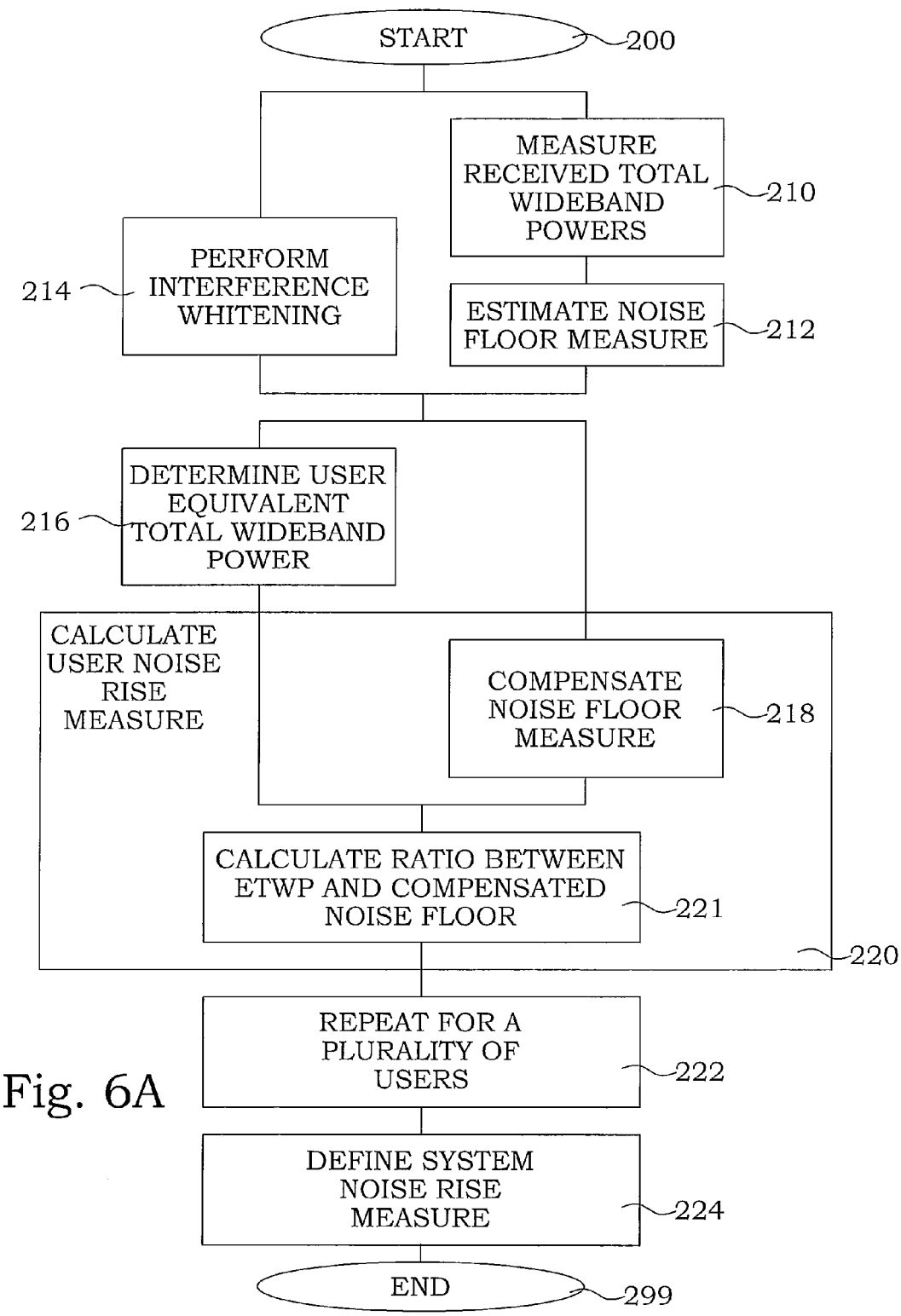
FIGS. 6A-C are flow diagrams of steps of embodiments of noise rise estimation methods according to the present invention.

FIG. 6A illustrates a flow diagram of steps of an embodiment of a method according to the present invention. The method for noise rise estimation in a wireless communication system begins in step 200. In step 210, received total wideband power is measured a plurality of times. An estimate of a noise floor measure is computed in step 212, based on at least a number of the measured received total wideband powers. In step 214, which can be performed before, during, interleaved with or after steps 210 and 212, an interference whitening is performed for a first user. The interference whitening is based on one of GRAKE, GRAKE+ and the chip equalizer.

In step 216, a user equivalent total wideband power is determined as an available total wideband power after the interference whitening for the first user. In step 218, which can be performed before, during, interleaved with or after step 216, the estimate of a noise floor measure is compensated for the interference whitening into a user compensated noise floor measure. Preferably, this step of compensating 218 the estimate of a noise floor measure comprises calculation of a scale factor representing a relation between a noise floor measure before interference whitening and a noise floor measure after interference whitening. In an even more preferred embodiment, the scale factor $\kappa_u$ is calculated based on at least a part of a covariance matrix representing the interference whitening. More detailed descriptions are provided further below. Then, a noise rise measure for said first user is calculated in step 221 based at least on the user equivalent total wideband power and the user compensated noise floor measure by calculating a ratio between the user equivalent total wideband power and the user compensated noise floor measure.

Steps 218 and 221 together form a general step of calculating 220 a user noise rise measure. This step may in other embodiments be configured somewhat differently.

In a preferred embodiment, the method also comprises the step 222, where the previous steps of performing 214, determining 216, compensating 218 and calculating 220 are repeated for a plurality of users. This repetition can of course be implemented as simultaneous processing for the different users. In step 224, a system noise rise measure is defined based on the noise rise measures for the plurality of users. This system noise rise measure can be defined in different manners. One alternative is to define the system noise rise measure as a maximum noise rise measure of the noise rise measures for the plurality of users. Another alternative is to define the system noise rise measure as an average noise rise measure of said noise rise measures for said plurality of users. Yet another alternative is to define the system noise rise measure as corresponding to a pre-selected percentile of said noise rise measures for said plurality of users. Also other approaches are possible. The procedure ends in step 299.

Figure 6B:
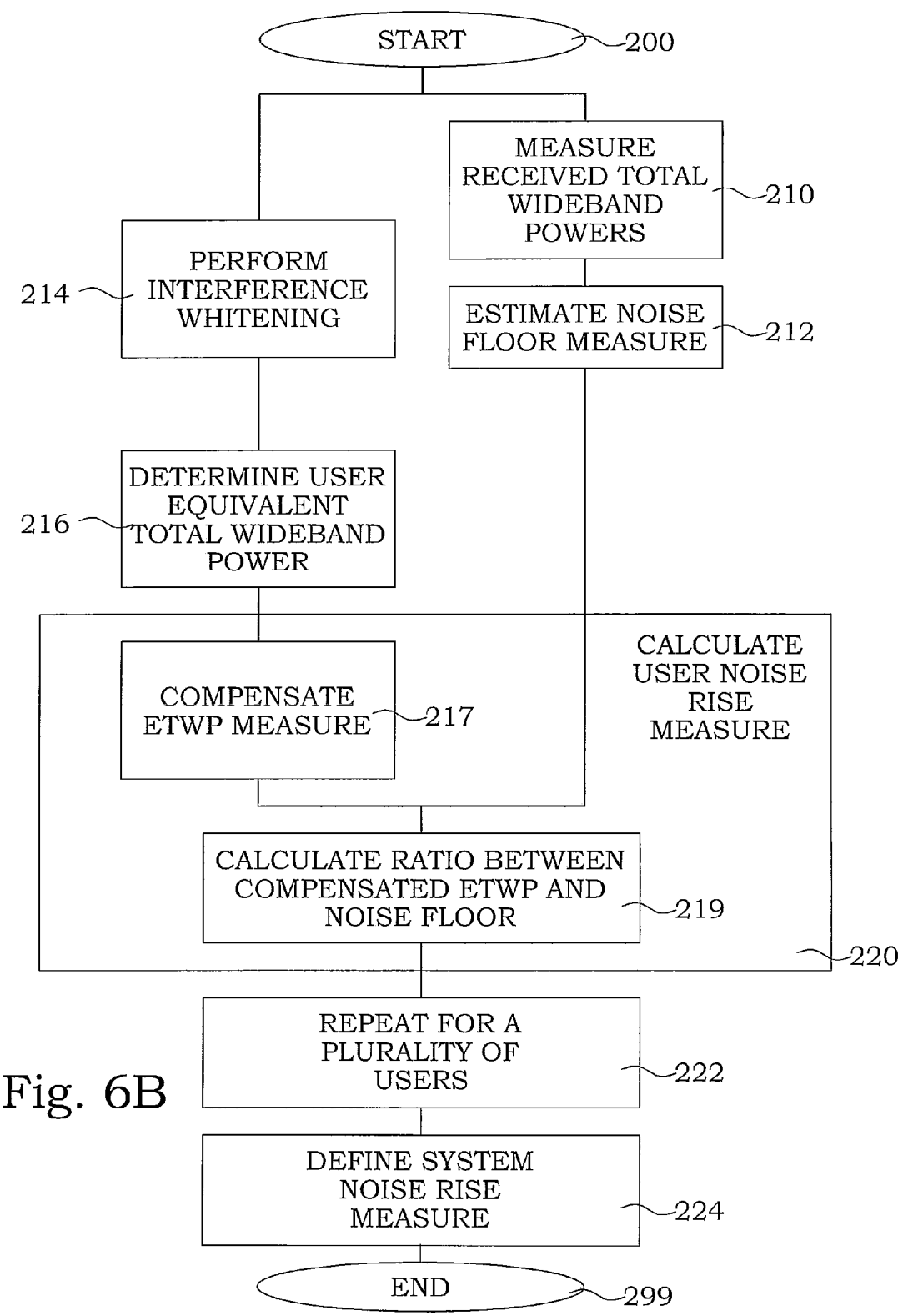

FIG. 6B illustrates another embodiment, in which step 220 of calculating a user noise rise measure is configured differently. The equivalent total wideband power is compensated for the effects caused by the interference whitening in step 217, giving a compensated total wideband power. This compensated total wideband power is then in step 219 used for calculating a noise rise measure as a ratio between the compensated total wideband power and the uncompensated noise floor measure achieved in step 212.

Figure 6C:
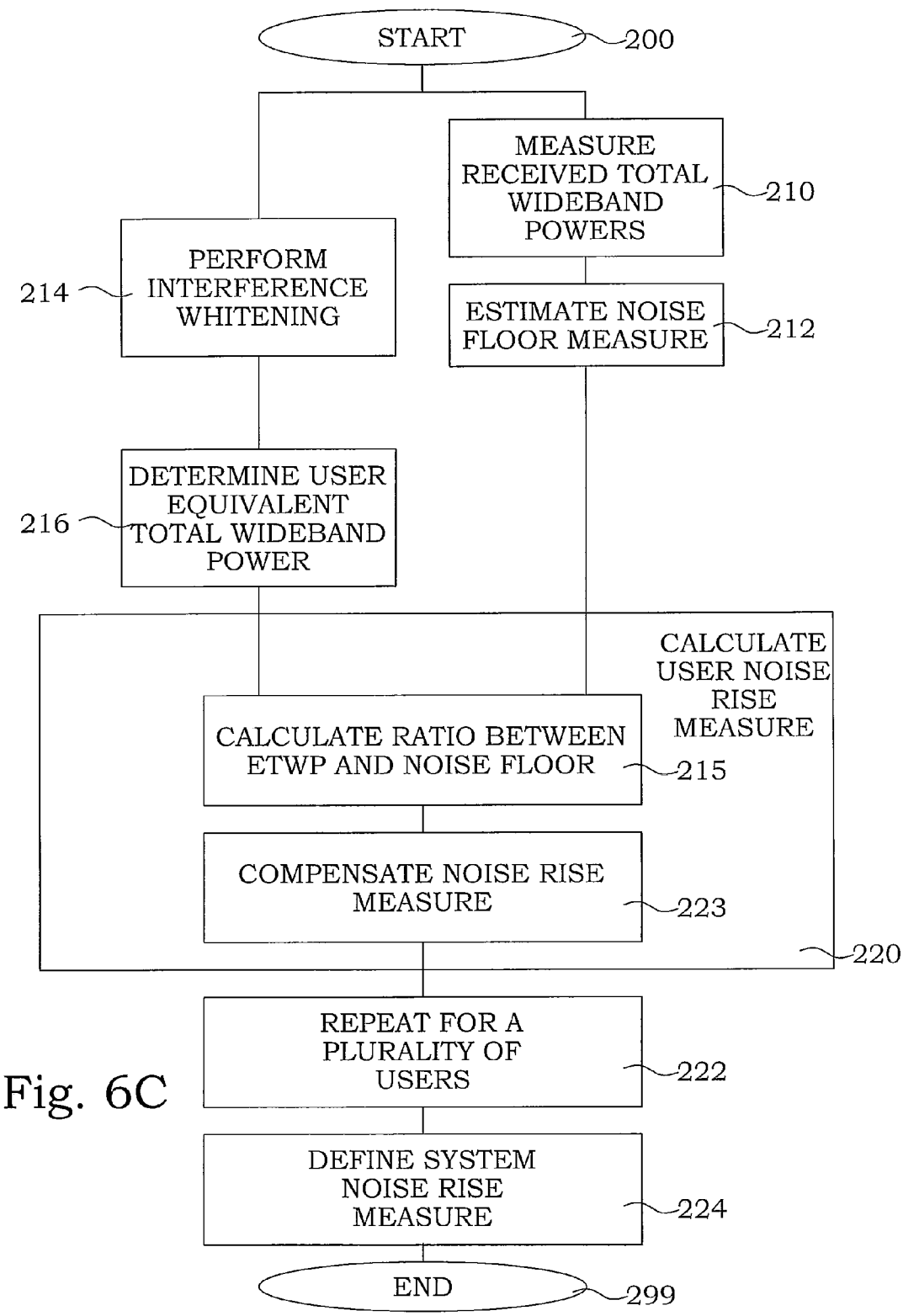

FIG. 6C illustrates yet another embodiment, in which step 220 of calculating a user noise rise measure is configured differently. The equivalent total wideband power and the uncompensated noise floor measure are in step 215 used for calculating an uncompensated noise rise measure by calculating the ratio between the equivalent total wideband power and the uncompensated noise floor measure. This uncompensated noise rise measure is then compensated for the effects caused by the interference whitening in step 223, giving a true noise rise measure.

The present invention thus discloses means for power estimation that reflect the additional interference gain of the GRAKE+ receiver or similar interference whitening receivers. Further, the present invention discloses means to compute and compensate for thermal noise floor estimation scale factor variations, caused by the interference whitening. These parts of the invention are valid for one specific user of a WCDMA uplink. Since the uplink load is a quantity relevant for all users of the uplink, the present invention also discloses means to combine powers, scale factors and load measures per user, to common powers and load measures for the WCDMA uplink.

A detailed embodiment based on GRAKE+ of the present invention is here below presented in more mathematical terms.

Measurement of Load after Interference Whitening in GRAKE+

To see how load can be estimated taking account of the GRAKE+ interference whitening gain, the powers after weight combining are studied. First, it is assumed that the received signal $y_{u,k}$ of user u on code $k \in \Omega_u$ is $$y_{u,k} = h_u s_{u,k} + I_{u,k} + N_{u,k}, u=1, \ldots, U, k=1, \ldots, K \quad (6)$$

where $\Omega_u$ denotes the set of codes for user u, $s_{u,k}$, u=1, ..., U, k=1, ..., K, is the signal, $I_{u,k}$, u=1, ..., U, k=1, ..., K, is the interference and $N_{u,k}$, u=1, ..., U, k=1, ..., K, is the (thermal) noise signal (not power). GRAKE+ then performs weight combining according to the equation:

$$\hat{z}_{u,k}^{G+} = \hat{w}_u^H y_{u,k} = \hat{h}_u^H \hat{R}_u^{-H} y_{u,k} = \hat{h}_u^H \hat{R}_u^{-H} h_u s_{u,k} + \hat{h}_u^H \hat{R}_u^{-H} I_{u,k} + \hat{h}_u^H \hat{R}_u^{-H} N_{u,k}, u=1, \ldots, U,$$
$$k=1, \ldots, K, \quad (7)$$

where $\hat{z}_{u,k}^{G+}$ is the sufficient statistics, $\hat{w}_u^H$ is the combining weight vector, $\hat{h}_u^H$ is the channel model and $\hat{R}_u^{-H}$ is the inverted conjugate transposed interference covariance matrix. Equation (7) has two main implications, one indicating how power measurements can be done and one indicating the scale factor problem which is addressed below.

Starting with the issue of power measurements, note that $$\hat{z}_{u,k}^{G+} = \hat{w}_u^H y_{u,k} = \hat{h}_u^H \hat{R}_u^{-H} y_{u,k} = \hat{h}_u^H \tilde{y}_{u,k}, u=1, \ldots, U,$$
$$k=1, \ldots, K \quad (8)$$

$$\tilde{y}_{u,k} = \hat{R}_u^{-H} y_{u,k}, u=1, \ldots, U, k=1, \ldots, K. \quad (9)$$

This means that the effect of the GRAKE+ weight combining is the same as if an artificial received signal would be processed with a conventional RAKE receiver. The artificial signal $\tilde{y}_{u,k}$ is equal to the originally received signal left multiplied by the inverted conjugate transposed covariance matrix $\hat{R}_u$.

Since the signals $\tilde{y}_{u,k}$, u=1, ..., U, k=1, ..., K, obviously reflect the weight combining and thereby the interference whitening gains of the GRAKE+ receiver, $\tilde{y}_{u,k}$, u=1, ..., U, k=1, ..., K, is a relevant starting point for load estimation.

As stated above, the load estimator operates by processing of the RTWP and in the future possibly also the RSEPS. For this reason, similar power signals need to be formed from the $\tilde{y}_{u,k}$, k=1, ..., K, in order to reuse the load concept applied without interference whitening.

User Power and Interference Estimation after Interference Whitening

To compute the RTWP (and the RSEPS), the channel power $\tilde{P}_u$ for each user is first summed up $$\tilde{P}_u = \sum_{k \in \Omega_u} \tilde{y}_{u,k}^H \tilde{y}_{u,k}, u = 1, \ldots, U. \quad (10)$$

The interference as seen by user u is then summed up over the remaining codes. The key is that this interference $\tilde{I}_u$ is summed up using the same combining weights as seen by user u.

$$\tilde{I}_u = \sum_{k \notin \Omega_u} \tilde{y}_{u,k}^H \tilde{y}_{u,k}, u = 1, \ldots, U. \quad (11)$$

Note that the interference contributions contain the thermal noise power.

It is now possible to combine this information in different ways, in this report one averaging approach and one bounding approach is used. Before the treatment of this, the scale factor variations caused by GRAKE+ need to be discussed more in detail.

User Noise Floor Scale Factor Estimation After Interference Whitening

Scale Factor for White Thermal Noise Power Floor—Slow Sampling

Returning to (7) to address the major problem, it is noted that the thermal noise is scaled by $\hat{R}_u^{-H}$ when the scaled received signal $\tilde{y}_{u,k}$ is used for computation of (10) and (11). This means that the thermal noise power level will no longer appear constant when the load estimation algorithm is fed with signals obtained from (10) and (11). This would render the application of load estimation to these signals useless, using RoT estimators known in prior art.

The approach taken here builds on a theoretical calculation of the scale factor by which the thermal noise power is scaled. The outputs of noise floor estimators acting on the total received wideband power measured before any interference whitening can then be re-scaled to the power scaling inside the respective GRAKE+ stages. Then (2) is applied with:

$$RoT^{G+} = \frac{I_{total}}{\kappa \hat{N}}, \quad (12)$$

where κ is the scale factor to be computed below, $\hat{N}$ is the noise power floor, estimated in the respective noise floor estimation stage, and where $I_{total}$ is a total interference measure. As will be seen below, it will be essential to select the interference measure and scaling per user—since the weight combining is user specific. Note also that the noise power floor hence needs to be estimated on signals before any processing by the GRAKE+ takes place. The scale factor can be computed as follows. First note that for the un-scaled received signal, the thermal noise power $P_{N,u,k}^{chip}$ is obtained by as the inner product $$P_{N,u,k}^{chip} = N_{u,k}^H N_{u,k}, \ u=1,\ldots,U, \ k=1,\ldots,K. \tag{13}$$

Equation (13) is valid at a specific chip, per code. This means that there is a scale factor K up to the total thermal noise power, assuming energy normalized codes. Introduce the assumption that the thermal noise components of different fingers are uncorrelated. This holds at least as long as the inverse of the delay spread falls well within the uplink bandwidth. Averaging over a longer periods of time (M) then results in $$\langle P_{N,u,k}^M \rangle = \frac{1}{M} \sum_{m=1}^{M} (N_{u,k}^m)^H N_{u,k}^m \xrightarrow[M\to\infty]{} E[(N_{u,k})^H N_{u,k}] \tag{14}$$
$$= P_{N,u,k}$$
$$= \frac{1}{K} P_N$$
$$= \frac{N_0}{K},$$
$$u = 1, \ldots, U, \ k = 1, \ldots, K.$$

Here the last step follows by definition. E[ ] denotes statistical expectation and $N_0$ the thermal noise power level.

Then, turning the attention to the scaled thermal noise floor contribution $\tilde{P}_{N,u,k}$ as seen by user u, on code k, it holds that $$\tilde{P}_{N,u,k} = \frac{1}{M} \sum_{m=1}^{M} (\tilde{N}_{u,k}^m)^H \tilde{N}_{u,k}^m \tag{15}$$
$$= \frac{1}{M} \sum_{m=1}^{M} tr\left((\tilde{N}_{u,k}^m)^H \tilde{N}_{u,k}^m\right)$$
$$= \sum_{m=1}^{M} tr\left(\frac{1}{M} (\tilde{N}_{u,k}^m)^H \tilde{N}_{u,k}^m\right)$$
$$= tr\left(\frac{1}{M}\sum_{m=1}^{M} \tilde{N}_{u,k}^m (\tilde{N}_{u,k}^m)^H\right) tr\left(\frac{1}{M}\sum_{m=1}^{M} \hat{R}_u^{-1} N_{u,k}^m (N_{u,k}^m)^H \hat{R}_u^{-H}\right)$$
$$= tr\left(\hat{R}_u^{-1}\left(\frac{1}{M}\sum_{m=1}^{M} N_{u,k}^m (\tilde{N}_{u,k}^m)^H\right)\hat{R}_u^{-H}\right),$$
$$u = 1, \ldots, U, \ k = 1, \ldots, K.$$

In (15) tr( ) denotes the matrix trace operator. It is reasonable to assume that the thermal noise averages faster than the interference changes, i.e. that $$\frac{1}{M}\sum_{m=1}^{M} N_{u,k}^m (N_{u,k}^m)^H \xrightarrow[M\to\infty]{} E[N_{u,k}(N_{u,k})^H] = \frac{N_0}{K}I, \tag{16}$$
$$u = 1, \ldots, U, \ k = 1, \ldots, K.$$

When inserted in (15), (16) gives $$\tilde{P}_{N,u,k} = tr\left(\hat{R}_u^{-1}(N_0/K)I\hat{R}_u^{-H}\right) = \frac{N_0}{K} tr\left(\hat{R}_u^{-1}\hat{R}_u^{-H}\right), \tag{17}$$
$$u = 1, \ldots, U, k = 1, \ldots, K.$$

This result has been obtained for one specific user. The following result for the scale factor due to the weight combining of GRAKE+ then results from (14) and (17)

$$\kappa_u = tr(\hat{R}_u^{-1}\hat{R}_u^{-H}). \tag{18}$$

Scale Factor for Colored Thermal Noise Power Floor—Fast Sampling

This subsection discusses the case where (16) is replaced by $$\frac{1}{M}\sum_{m=1}^{M} N_{u,k}^m (N_{u,k}^m)^H \xrightarrow[M\to\infty]{} E[N_{u,k}(N_{u,k})^H] = \frac{N_0}{K}R_N \neq \frac{N_0}{K}I, \tag{19}$$
$$u = 1, \ldots, U,$$

i.e. the case when sampling is fast enough to capture the shape of the uplink spectrum. $R_N$ is the covariance matrix representing the correlation due to the spectral shape of the whole wideband channel, including effects of the pulse shaping filters. In this case it follows that (14) is transformed to $$\langle P_{N,u,k}^M \rangle = \frac{1}{M}\sum_{m=1}^{M} (N_{u,k}^m)^H N_{u,k}^m \xrightarrow[M\to\infty]{} E[(N_{u,k})^H N_{u,k}] \tag{20}$$
$$= tr(E[N_{u,k}(N_{u,k})^H])$$
$$= \frac{N_0}{K} tr(R_N)$$

Furthermore, (17) is transformed into $$\tilde{P}_{N,u,k} = tr\left(\hat{R}_u^{-1}(N_0/K)R_N \hat{R}_u^{-H}\right) = \frac{N_0}{K} tr\left(\hat{R}_u^{-1} R_N \hat{R}_u^{-H}\right). \tag{21}$$

The end result in this case is the scale factor $$\kappa_u = \frac{tr\left(\hat{R}_u^{-1} R_N \hat{R}_u^{-H}\right)}{tr(R_N)} \tag{22}$$

User Load Estimation after Interference Whitening

The load after GRAKE+ interference whitening processing as seen by user u is then $$RoT_u^{G+}(t) = \frac{\tilde{P}_u(t) + \tilde{I}_u(t)}{\kappa_u \hat{N}(t)} = \frac{\tilde{P}_u(t) + \tilde{I}_u(t)}{tr\left(\hat{R}_u^{-1}\hat{R}_u^{-H}\right)\hat{N}(t)}, \tag{23}$$
$$u = 1, \ldots, U.$$

$RoT_u^{G+}(t)$ is thus a noise rise measure, and therefore also an indication of the present load. Note that here the estimate of the thermal noise power floor need to be estimated before any GRAKE+ processing.

WCDMA Uplink Load Estimation, Over all Users

It is not obvious how the loads should be combined over different users. Three embodiments are therefore described here.

Average Load Measure

In this case the approach needed is to divide the powers and the interference for each user, by the appropriate scale factor before averaging. It is not possible to apply an averaged scale factor to a noise power floor level computed before GRAKE+ weight combining, rather the approach needs to be one of averaging RoTs over the users as follows, $$\langle RoT^{G+} \rangle = \frac{1}{U} \sum_{u=1}^{U} \frac{\tilde{P}_u}{\kappa_u \hat{N}} + \frac{\tilde{I}_u}{\kappa_u \hat{N}} \quad (24)$$

$$= \frac{\frac{1}{U} \sum_{u=1}^{U} \left( (\tilde{P}_u + \tilde{I}_u)/\kappa_u \right)}{\hat{N}}$$

$$\equiv \frac{\langle P_{RTWP}^{G+} \rangle}{\hat{N}},$$

where $$\langle P_{RTWP}^{G+} \rangle = \frac{1}{U} \sum_{u=1}^{U} \left( (\tilde{P}_u + \tilde{I}_u)/\kappa_u \right). \quad (25)$$

is the appropriate equivalent of the received total wideband power, when averaged interference is considered for GRAKE+. The reason for the result is of course that the scale factor is specific for user u. Following the same approach for the RSEPS users, the following result is obtained, $$\langle P_{RSEPS}^{G+} \rangle = \frac{1}{U_{RSEPS}} \sum_{u_{RSEPS}=1}^{U_{RSEPS}} \left( (\tilde{P}_{u_{RSEPS}}^{RSEPS} + \tilde{I}_{u_{RSEPS}}^{RSEPS})/\kappa_{u_{RSEPS}} \right). \quad (26)$$

Worst Case Load Measure

Rather than performing averaging a worst case approach may be taken, where the averaging is replaced by a maximum operation. This means that the user that sees the maximum total RoT is used for load estimation purposes. This conservative approach could be motivated by cell stability arguments—however it may also be too conservative. The worst case, bounding approach is defined by the equations $$u_{max} = \underset{u}{\mathrm{argmax}}(RoT_u^{G+}) = \underset{u}{\mathrm{argmax}} \frac{\tilde{P}_u + \tilde{I}_u}{\kappa_u \hat{N}} \quad (27)$$

$$\max(P_{RTWP}^{G+}) = \frac{(\tilde{P}_{u_{max}} + \tilde{I}_{u_{max}})}{\kappa_{u_{max}}} \quad (28)$$

$$\max(P_{RSEPS}^{G+}) = \frac{(\tilde{P}_{u_{mac}}^{RSEPS} + \tilde{I}_{u_{max}}^{RSEPS})}{\kappa_{u_{max}}} \quad (29)$$

$$\max(RoT^{G+}) = \frac{(\tilde{P}_{u_{max}} + \tilde{I}_{u_{max}})}{\kappa_{u_{max}} \hat{N}} \quad (30)$$

It is essential to compute the maximum value over the sum of channel power and interference power. Further, the RSEPS power needs to be computed from the maximizing user, in order to secure that $\max(P_{RTWP}^{G+}) \geq \max(P_{RSEPS}^{G+})$.

Outage Interference Measure

A third alternative would be to sort the $RoT_u^{G+}$ and then select the user corresponding to a selected percentile.

Today, it is common practice to implement the computationally most intense parts of the WCDMA uplink radio receivers on application specific integrated circuits (ASICs). Typically, such ASICs provides RAKE, GRAKE or GRAKE+ receiver processing for a multitude of users, using dedicated parallel hardware. It is e.g. previously known to implement channel estimation, weight combining, demodulation and decoding on such ASICS, for multiple users. To achieve this, the ASICS may be equipped with dedicated accelerators e.g. for TURBO decoding, matrix operations and similar. This is facilitated by the fact that ASICS can be programmed to perform different tasks, exploiting a variety of such hardware accelerator resources. To our knowledge, prior to the present invention, dedicated processing means for load estimation has however not been implemented on ASICS.

In a preferred embodiment of an arrangement for noise rise estimation in a wireless communication system, at least a part of the functionality of the processor as illustrated in FIG. 5 is implemented by at least one of an Application Specific Integrated Circuit (ASIC) and a Digital Signal Processor (DSP). The embodiment presents ASIC implementation of at least a subset of the above described functionality.

Figure 7:
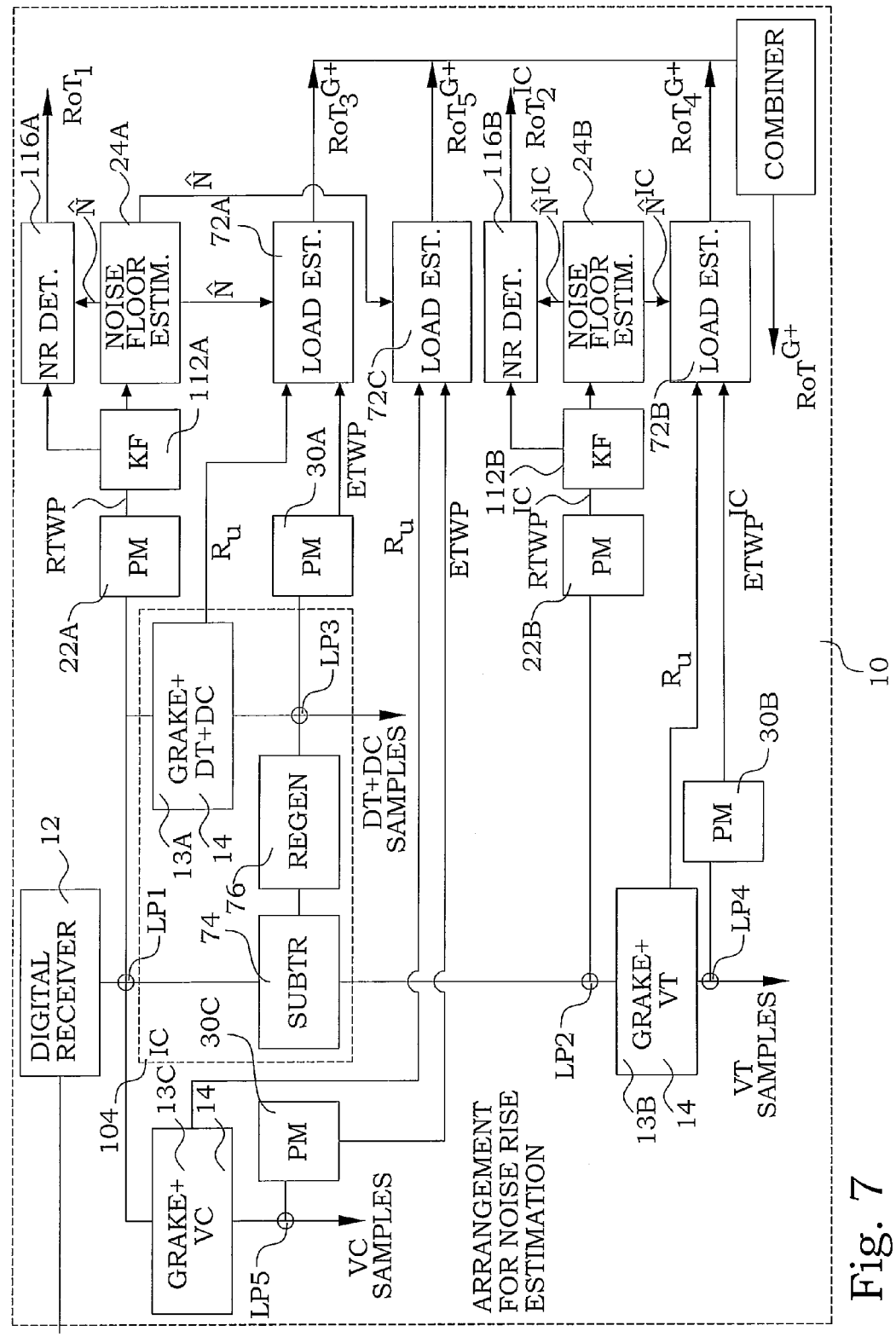
FIG. 7 is a schematic illustration of another embodiment of a noise rise estimation arrangement according to the present invention.

FIG. 7 depicts a load estimator structure in a typical embodiment reflecting a tentative uplink receiver structure. This embodiment is relatively easily implemented by an ASIC or a DSP. This particular embodiment combines subtraction IC and GRAKE+.

A digital receiver 12 provides chip samples to a first load point LP1. The chip samples are provided to three interference whiteners 14, in this embodiment GRAKE+ unit 13A, GRAKE+ unit 13B and GRAKE+ unit 13C. GRAKE+ unit 13A is configured to consider only data traffic signals and data control signals, GRAKE+ unit 13B is configured to consider only voice traffic signals and GRAKE+ unit 13C is configured to consider only voice control signals. The data traffic signals and data control signals from interference whitened by GRAKE+ unit 13A are used for regenerating a version of the original signals connected to data traffic in a data traffic regenerator 76. This regenerated signal is then subtracted from the original chip sample in the subtractor 74. The difference signal available at a second load point LP2 is thereby mainly comprises contributions from voice traffic signals. The GRAKE+ unit 13A, the data traffic regenerator 76 and the subtractor 74 together form an interference canceller 104 based on interference whitening, regeneration and subtraction.

Load measures or in particular noise rise measures such as rise over thermal (RoT) can be obtained from different positions in the system. The load in the first load point LP1 and in the second load point LP2 can be obtained by a load estimation according to prior art ideas. To this end, a power meter 22A measures the received total wideband power RTWP at LP1. Preferably, other quantities such as Received Scheduled Enhanced dedicated channel Power Share (RSEPS) may also be utilized. The measured RTWP is provided to a Kalman filter 112A, which outputs probability density functions of the RTWP to a noise floor estimator 24A, which in turn provides a noise floor estimate $\hat{N}$. The Kalman filter 112A furthermore provides a filtered RTWP measure to a noise rise determiner 116A, which by assistance of the noise floor estimate $\hat{N}$ determines a first noise rise measure $RoT_1$ associated with the first load point LP1. Similarly, the signals at the second load point LP2, i.e. the signals that are subjected to interference cancellation of the interference canceller 104, can also be used in an analogue manner. A power meter 22B, a Kalman filter 112B, noise floor estimator 24B and a noise rise determiner 116A is connected in an analogue manner to provide a second noise rise measure $\mathrm{RoT}_2^{IC}$ associated with the second load point LP2. Note that the load estimate at LP1 is valid for the uplink, while the estimate at LP2 is individual for each user.

However, the arrangement has also access to several GRAKE+ units, which allows the system to utilize suppression of interference by means of interference whitening. The most appropriate load measure for scheduling purposes would therefore be a combined measure of the loads for the individual GRAKE+ units. This can be performed according to the ideas in the present disclosure. A third, fourth and fifth load point LP3-LP5 are located directly after a respective weight combining. At the third load point LP3 after the GRAKE unit 13A, signals connected to data traffic and data control remains whereas signals connected to voice traffic and voice control are suppressed by considering them as interference, as are data traffic and control signals of other users than the one being processed. A power meter 30A measures equivalent total wideband power ETWP and preferably also power quantities related to RSEPS and interference powers and provides these measures to a load estimator 72A. The GRAKE unit 13A also provides the covariance matrix $R_u$ representing the interference whitening. The load estimator 72A comprises in this embodiment a scale factor determiner, an equivalent noise floor compensator and a noise rise calculator in analogy with FIG. 5. A third noise rise measure $\mathrm{RoT}_3^{G+}$ associated with the third load point LP3 after GRAKE+ interference whitening is estimated based on the measured equivalent total wideband power, a scale factor deduced from the covariance matrix $R_u$ and the noise floor estimate $\hat{N}$ as achieved from the noise floor estimator 24A.

Similarly, at the fourth load point LP4 after the GRAKE unit 13B, signals connected to voice traffic remains whereas signals of other users are suppressed by considering them as interference. A power meter 30B measures equivalent total wideband power $\mathrm{ETWP}^{IC}$ associated with the interference cancelled signals and preferably also power quantities related to RSEPS and interference powers and provides these measures to a load estimator 72B. The GRAKE unit 13B also provides the covariance matrix $R_u$ representing the interference whitening. The load estimator 72B comprises in this embodiment a scale factor determiner, an equivalent noise floor compensator and a noise rise calculator in analogy with FIG. 5. A fourth noise rise measure $\mathrm{RoT}_4^{G+}$ associated with the fourth load point LP4 after GRAKE+ interference whitening of the interference cancelled signal is estimated based on the measured equivalent total wideband power, a scale factor deduced from the covariance matrix $R_u$ and the noise floor estimate $\hat{N}$ as achieved from the noise floor estimator 24B.

Finally, at the fifth load point LP5 after the GRAKE unit 13C, signals connected to voice control remains whereas signals of other users are suppressed by considering them as interference. A power meter 30C measures equivalent total wideband power ETWP and preferably also power quantities related to RSEPS and interference powers and provides these measures to a load estimator 72C. The GRAKE unit 13C also provides the covariance matrix $R_u$ representing the interference whitening. The load estimator 72C comprises in this embodiment a scale factor determiner, an equivalent noise floor compensator and a noise rise calculator in analogy with FIG. 5. A fifth noise rise measure $\mathrm{RoT}_5^{G+}$ associated with the fifth load point LP5 after GRAKE+ interference whitening of the interference cancelled signal is estimated based on the measured equivalent total wideband power, a scale factor deduced from the covariance matrix $R_u$ and the noise floor estimate $\hat{N}$ as achieved from the noise floor estimator 24A.

The load information associated with the loads immediately after weight combining of the three GRAKE units 13A-C are combined in a load combiner 78. Possibly, also the second noise rise measure $\mathrm{RoT}_2^{IC}$ associated with the second load point LP2 can be used as input to the load combiner 78. The combination may be performed in different ways, e.g. as a direct sum, as a weighted sum or according or by an algorithm depending on the present load distribution situation.

If implementing the system of FIG. 7 by ASIC functionality, specific algorithms and interfaces are needed in the ASIC for computation and signalling. The equations (10), (11) need identifications carrying information on whether the user is an RSEPS user. Also according to equations (18) or (22) identifications carrying information on whether the user is an RSEPS user is also needed. Furthermore, the algorithms need to be implemented for each GRAKE+ block of FIG. 7. The quantities above need to be made available for load computation at least with 10 ms rate, possibly by 2 ms rate.

Note that scale factor errors are of the order of 1 dB occur between antenna branches. Unless a separate estimation of noise power floors are used, the consequence is that a too large margin may be needed in the scheduler. This follows since the dominating antenna channel (the one with the highest scale factor) would also dominate the noise floor estimation. Hence, the RoT would be underestimated for the channel with the lowest scale factor, something that opens up for reduced stability margins via the antenna branch with the lowest actual scale factor. The ASIC should hence also preferably allow for functionality that distinguishes between different analogue signal paths.

The invention discloses techniques that allow for load estimation that reflects the interference whitening gains of GRAKE+ and similar techniques, thus enhancing coverage and cell throughput at system level. Without the disclosed invention, large parts of the link gains associated with GRAKE+ would not materialize, due to the need to use too conservative margins.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

ABBREVIATIONS

ASIC—Application Specific Integrated Circuits
DSP—Digital Signal Processor
EUL—Enhanced UpLink
GRAKE—Generalized RAKE
IC—Interference Cancellation
RBS—Radio Base Station
RoT—Rise over Thermal
RSEPS—Received Scheduled Enhanced dedicated channel Power Share
RTWP—Received Total Wideband Power
SIR—Signal to Interference Ratio
UE—User Equipment
WCDMA—Wideband Code Division Multiple Access

The invention claimed is:

1. A method for noise rise estimation in a wireless communication system, said method comprising:
   measuring received total wideband power a plurality of times;
   computing an estimate of a noise floor measure based on at least a number of said measured received total wideband powers;
   performing an interference whitening based on one of GRAKE and chip equalizer for a first user;
   determining a user equivalent total wideband power as an available total wideband power after said interference whitening for said first user;
   calculating a noise rise measure for said first user, based at least on said user equivalent total wideband power and said noise floor measure; and
   wherein calculating a noise rise measure for said first user comprises compensating said noise rise measure for said interference whitening.

2. The method of claim 1 wherein said compensating comprises compensating at least one of said user equivalent total wideband power, said noise floor measure, and a ratio between said user equivalent total wideband power and said noise floor measure for effects caused by said interference whitening.

3. The method of claim 1 comprising:
   repeating, for a plurality of users:
      performing an interference whitening based on one of GRAKE and chip equalizer;
      determining a user equivalent total wideband power as an available total wideband power after said interference whitening;
      calculating a noise rise measure based at least on said user equivalent total wideband power and said noise floor measure; and
      compensating said noise rise measure for said interference whitening; and
   defining a system noise rise measure based on said noise rise measures for said plurality of users.

4. The method of claim 3 wherein said system noise rise measure is defined as a maximum noise rise measure of said noise rise measures for said plurality of users.

5. The method of claim 3 wherein said system noise rise measure is defined as an average noise rise measure of said noise rise measures for said plurality of users.

6. The method of claim 3 wherein said system noise rise measure is defined as corresponding to a pre-selected percentile of said noise rise measures for said plurality of users.

7. The method of claim 1 wherein said compensating comprises calculating a scale factor $\kappa_u$ representing a relation between a noise floor measure before interference whitening, and a noise floor measure after interference whitening.

8. The method of claim 7 wherein said scale factor $\kappa_u$ is calculated based on at least a part of a covariance matrix representing said interference whitening.

9. The method of claim 8 wherein said scale factor $\kappa_u$ is calculated according to:

$$\kappa_u = tr(\hat{R}_u^{-1} \hat{R}_u^{-H}),$$

where $R_u$ is the interference covariance matrix.

10. The method of claim 8 wherein said scale factor $\kappa_u$ is calculated according to:

$$\kappa_u = \frac{tr(\hat{R}_u^{-1} R_N \hat{R}_u^{-H})}{tr(R_N)},$$

where $R_u$ is the interference covariance matrix and where $R_N$ is the covariance matrix representing the correlation due to the spectral shape of the whole wideband channel, including effects of the pulse shaping filters.

11. An arrangement for noise rise estimation in a wireless communication system, comprising:
   a digital receiver;
   an interference whitener connected to said digital receiver, said interference whitener being based on one of GRAKE and chip equalizer and configured to provide interference whitening for a plurality of users at an output; and
   a processor connected to said digital receiver and to said output from said interference whitener, and configured to:
      measure received total wideband power received at said digital receiver a plurality of times;
      compute an estimate of a noise floor measure based on at least a number of said measured received total wideband powers;
      determine a user equivalent total wideband power as an available total wideband power on said output from said interference whitener, operating for a first user of said plurality of users;
      calculate a noise rise measure for said first user, based at least on said user equivalent total wideband power and said user noise floor measure; and
      compensate said noise rise measure for said interference whitening.

12. The arrangement of claim 11 wherein said processor is further configured to:
   repeat, for said plurality of users:
      performing an interference whitening based on one of GRAKE and chip equalizer;
      determining a user equivalent total wideband power as an available total wideband power on said output from said interference whitener;
      calculating a noise rise measure based at least on said user equivalent total wideband power and said user noise floor measure; and
      compensating said noise rise measure for said interference whitening; and
   define a system noise rise measure based on said noise rise measures for said plurality of users.

13. The arrangement of claim 11 wherein at least said processor is implemented by at least one of an application specific integrated circuit and a digital signal processor.

14. A base station for a wireless communication system, the base station comprising:
   a noise rise estimation arrangement comprising:
      a digital receiver;
      an interference whitener connected to said digital receiver, said interference whitener being based on one of GRAKE and chip equalizer and configured to provide interference whitening for a plurality of users at an output; and
      a processor connected to said digital receiver and to said output from said interference whitener, and configured to:

measure received total wideband power received at said digital receiver a plurality of times;

compute an estimate of a noise floor measure based on at least a number of said measured received total wideband powers;

determine a user equivalent total wideband power as an available total wideband power on said output from said interference whitener, operating for a first user of said plurality of users;

calculate a noise rise measure for said first user, based at least on said user equivalent total wideband power and said user noise floor measure; and compensate said noise rise measure for said interference whitening.

15. The base station of claim 14 wherein said processor is further configured to:

repeat, for said plurality of users:

performing an interference whitening based on one of GRAKE and chip equalizer;

determining a user equivalent total wideband power as an available total wideband power on said output from said interference whitener;

calculating a noise rise measure based at least on said user equivalent total wideband power and said user noise floor measure; and compensating said noise rise measure for said interference whitening; and define a system noise rise measure based on said noise rise measures for said plurality of users.

16. The base station of claim 14 wherein at least said processor is implemented by at least one of an application specific integrated circuit and a digital signal processor.

* * * * *

UNITED STATES PATENT AND TRADEMARK OFFICE
CERTIFICATE OF CORRECTION

| | | |
|---|---|---|
| PATENT NO. | : 8,605,842 B2 | Page 1 of 1 |
| APPLICATION NO. | : 13/376908 | |
| DATED | : December 10, 2013 | |
| INVENTOR(S) | : Wigren | |

It is certified that error appears in the above-identified patent and that said Letters Patent is hereby corrected as shown below:

In the Specification

In Column 10, Line 14, delete " $\tilde{y}_{u,k}, k=1,\ldots,K,$ " and insert -- $\tilde{y}_{u,k}, u=1,\ldots, U, k=1,\ldots,K,$ --, therefor.

Signed and Sealed this
Thirteenth Day of January, 2015

Michelle K. Lee
*Deputy Director of the United States Patent and Trademark Office*